E0152 XR 2,815,440

Dec. 3, 1957 W. S. FLETCHER 2,815,440

REMOTELY CONTROLLED PLURAL ANTENNAS AND RADIO FREQUENCY AMPLIFIERS FOR RECEIVERS

Filed April 27, 1953 2 Sheets-Sheet 1

INVENTOR.
WENDELL S. FLETCHER
BY HIS ATTORNEYS.
HARRIS, KIECH, FOSTER & HARRIS

INVENTOR.
WENDELL S. FLETCHER

BY HIS ATTORNEYS.
HARRIS, KIECH, FOSTER & HARRIS

United States Patent Office 2,815,440

Patented Dec. 3, 1957

2,815,440

REMOTELY CONTROLLED PLURAL ANTENNAS AND RADIO FREQUENCY AMPLIFIERS FOR RECEIVER

Wendell S. Fletcher, South Pasadena, Calif.

Application April 27, 1953, Serial No. 351,334

12 Claims. (Cl. 250—20)

This invention relates to a multiple antenna arrangement for a radio-frequency utilization circuit and relates more particularly to the selective multiantenna and receiver system adapted to receive radio waves of a desired frequency or frequency band for use in conventional television receivers or reproducers.

Heretofore it has been common practice to provide a television reproducer with a remotely located single antenna or dual antenna having communication with the reproducer by means of an extended transmission line or coaxial cable. In the instance of use of a dual antenna, the two leads of each are connected in parallel relation with the transmission line.

Disadvantages of this conventional antenna arrangement have become increasingly apparent to the ordinary home user of a television receiver and more apparent to users who reside in apartment buildings, hotels, and the like, where it is necessary to have the receiving antenna located a considerable distance from the reproducer. It has been determined in such conventional use that the greater the length of the transmission line intermediate the antenna and the reproducer the greater becomes the distortion of the wave form as well as an undesirable increase in noise level and other factors tending to adversely affect the fidelity of reception. In an effort to overcome certain of these undesirable effects, which in television reception is most apparent in image resolution, transmission lines have been shielded and otherwise encased but without measurable satisfactory results.

Further, by the use of a single antenna to serve a plurality of frequency channels, for example, in television reception, the physical characteristics of such an antenna cannot be designed to efficiently receive all channel frequencies, and most likely will only accommodate a high signal-strength-to-noise ratio of only one of the channels. Accordingly, one channel will be efficiently received, whereas the others will have a lesser image resolution on the television reproducer.

Further, high-frequency antennae as are used in television reception are of the directive receiving type and are necessarily angularly trained with respect to the transmitter to achieve optimum performance. Generally, television transmitters serving a certain area are not located in the same vicinity and accordingly it is impossible to have a single receiving antenna properly directed to receive all radio-frequency waves at optimum efficiency.

It is a general object of this invention, therefore, to overcome certain of the aforementioned disadvantages and provide a multiple antenna arrangement for selectively and efficiently receiving a particular selected frequency for application to a radio-frequency utilization circuit.

It is another object of the invention to provide circuit means intermediate the antennae and utilization circuit whereby the desired signal frequency may be effectively isolated and increased in gain prior to application to the utilization circuit.

To accomplish the foregoing objects, an antenna system of the type to which the invention particularly pertains comprises a plurality of differently tuned radio-frequency receivers arranged at a remote location with respect to the reproducer, each receiver having an antenna adjusted to the frequency of its receiver and a circuit tuned to the same frequency intermediate each of the antennae and its corresponding receiver.

It is another object of this invention to provide a radio-frequency receiver and antenna therefor for each of the frequencies to be received, each of which receivers may be remotely located with respect to the utilization circuit, and each of which receivers may be selectively energized.

Another object of this invention is to provide such receivers with a means whereby the output of each receiver may be connected to a single transmission medium for transmission of any of the frequencies received to the utilization circuit.

It is a further object of this invention to provide a means whereby the remotely disposed receivers may be energized by a source of low voltage whereby the power lines supplying such voltage need not be shielded, encased, or otherwise enclosed as ordinarily would be required of higher voltage power lines to accord with now customary local governmental regulations.

A further object of this invention is to provide a multiple antenna arrangement having a plurality of receivers and antennae therefor, each remotely disposed from a utilization circuit having a frequency selector means, and including means to selectively energize any of the receivers to correspond with a frequency selected for the utilization circuit.

A further object is to provide a multiple antenna arrangement of the aforementioned character whereby each of the receivers is instantly responsive through energization thereof in order that the frequency channels may be changed by the user without a delay in receiving the desired reception.

The foregoing and other objects of the invention, together with numerous advantages thereof and various novel features thereof, will appear from the following specification and the accompanying drawings, which are for the purpose of illustration only, and in which.

Figure 1:
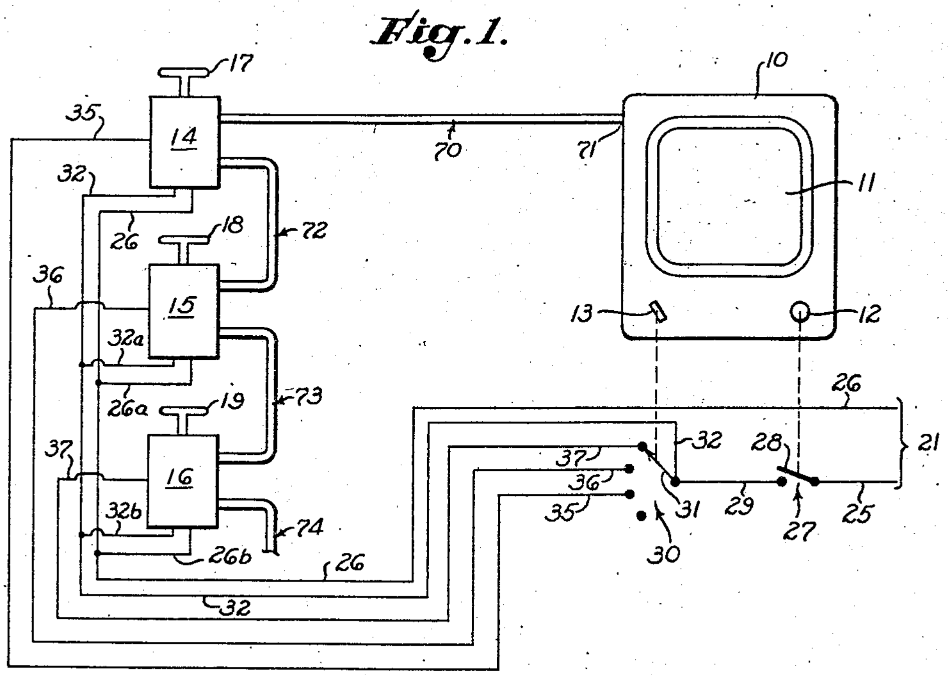
Fig. 1 is a schematic diagram of a multiple antenna arrangement embodying the features of the invention and showing its connection with a utilization circuit or television reproducer.

Referring to Fig. 1, there is illustrated a multiple antenna arrangement according to the present invention and in electrical connection with a utilization circuit that may be used in the field of radio or television. In particular, the utilization circuit is shown as a conventional television reproducer 10 which may be located in a master location such as a home, apartment, etc., and having a conventional cathode-ray tube 11, an on-off control 12, and a channel frequency selector 13, and provided with a source of power (not shown) for energization thereof.

The antenna arrangement is shown comprising a plurality of radio-frequency receiver units 14, 15, 16, etc., having antennae 17, 18, 19, etc., respectively, connected to the input of the receivers respectively. Each antenna is designed and tuned to receive a predetermined transmitted radio frequency at optimum signal strength and is located in a selected position about the home and oriented in such a manner as to receive the radio frequency to which it is tuned at optimum efficiency. Preferably, each antenna is placed so as to be in line-of-sight relationship with the transmitter of the frequency to be received and, usually, it is sufficient to mount the antennae on the roof of the house or within the confines of the attic. Thus, there may be provided a receiving antenna for each television transmitter channel to individually receive each channel frequency.

The receivers 14, 15, 16, etc., are located relatively close to their respective antennae in order that the connections therebetween may be relatively short. Effectively, therefore, the receivers will be located in such remote positions as the antennae may be placed, for example, in the attic of the home.

Each of the receivers 14, 15, 16, etc., is provided with a power input means and a signal output means with electrical connections therefor to the master location. Power is provided to the receivers by a source of power 21 at the master location, the voltage of which is alternating potential (A. C.) and of such a value or less than the maximum amount that is permitted to be transmitted and conveyed through a building or other structure without the necessity of a protective encasement or cabling that would otherwise be required by local governmental regulations if the voltage were of a higher value. For purposes of illustration, therefore, the source of power herein may be selected as 12 volts A. C. and is applied to conductors 25 and 26 that may be designated as supply and return conductors respectively.

Connected to the conductor 25 is a master power switch 27 having a movable arm 28 that is adapted to be operatively connected to the on-off control switch 12 of the television reproducer 10, and constructed and arranged so that when the on-off switch is moved to the "on" position the master power switch 27 is simultaneously moved to its closed or "on" position.

A conductor 29 leads from the master switch 27 and is connected to a selector switch 30, such connection being made to a movable arm 31 which is provided with a plurality of branch power conductors 35, 36, 37, etc., for selective connection therewith. The movable arm 31 is adapted to be connected to the movable elements of the channel frequency selector 13, for example, as by movement of a common rotor, whereby the arm 31 will be displaced simultaneously with the movement of the channel frequency selector 13 as controlled by the user. Thus a particular branch power conductor is energized for each channel frequency selected.

A conductor 32 is connected to the conductor 29 at the joinder with the movable arm 31 to provide a source of power to the heaters of the electron tubes within the receivers 14, 15, and 16, particularly as indicated by the conductors 32, **32*a* and 32*b*. The conductor 26, which serves as a return line is communicated to the receivers 14, 15 and 16 as indicated by the conductor 26 and conductors 26*a* and 26*b***.

Figures 2, 3, 4:
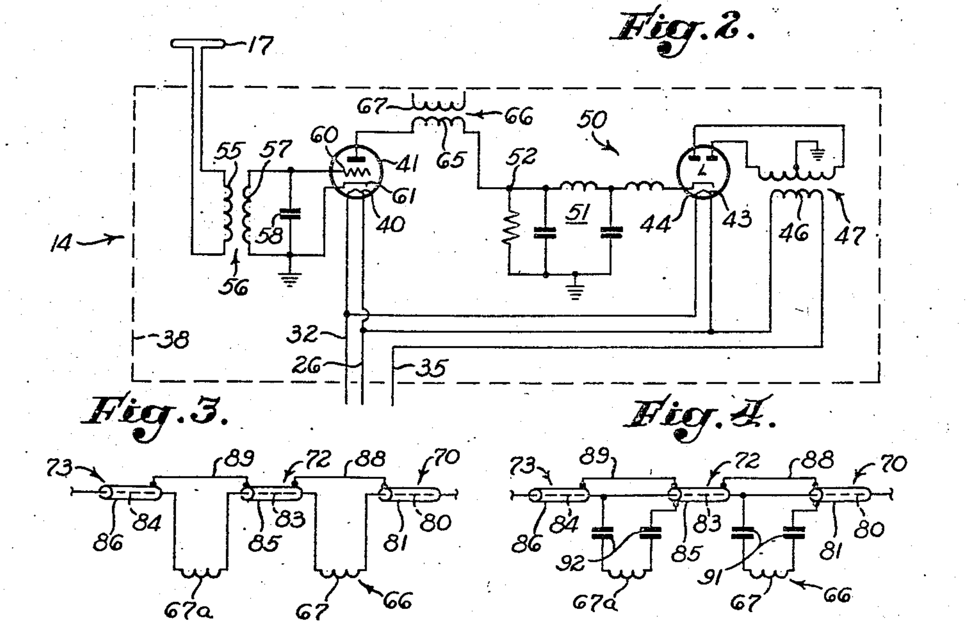
Fig. 2 is a schematic diagram of one of the radio-frequency receiver units of the antenna arrangement of Fig. 1.
Figs. 3 and 4 are schematic diagrams of two alternative means of engaging the output of the receivers of Fig. 2 with a common transmission line.

The circuit arrangement of each of the receiver units 14, 15 and 16 may be similar, each of which arrangements is illustrated in Fig. 2. Considering therefore the circuit arrangement of the receiver 14 as is shown in Fig. 2, the power input means including the conductors 35, 32 and 26 extend from the master location to the receiver 14 through a shielded chassis 38 and to branch conductors therein to the energization circuits. The conductor 32 is connected to one side of a heating element 40 of an electron tube 41 and to one side of a heating element 43 of a rectifier tube 44. The other side of each of the heating elements is connected to the return conductor 26. The conductor 35 is connected to one side of a primary winding 46 of a power transformer 47, the other side of the primary winding being connected to the return conductor 26.

The reference numeral 50 indicates a conventional rectification circuit including the transformer 47, the rectifier tube 44 and a filter network 51. The transformer 47 is preferably of the step-up type to provide a direct-current potential at the output of the rectification circuit 50 and filter 51, for example, at the point indicated by the numeral 52, which potential is sufficient to supply the demand of the tube 41.

Considering now the particular signal to be received, the antenna 17 receives the signal, which signal is conveyed to a primary winding 55 of a coupling transformer 56. The transformer is provided with a secondary winding 57 across which is shunted a condenser 58. The transformer 56 and the condenser 58 provide a resonant circuit for the particular frequency to be received whereby its voltage is caused to appear across a grid 60 and cathode 61 of the tube 41. The tube 41 is preferably an amplification stage whereby the signal is amplified, the output voltage appearing across a primary winding 65 of a coupling transformer 66. The signal is transferred to a secondary winding 67, being isolated from the direct-current voltage at the primary winding 65, and the signal output therefore is available for transmission to the utilization circuit or reproducer 10.

As hereinbefore indicated, the receiver units 14, 15 and 16 are similar, and accordingly each is provided with a secondary winding. Referring to Fig. 1, each of the receiver units is provided with a means for connecting its signal output in cascade for communication to the reproducer 10. In particular, a transmission line or coaxial cable 70 is connected to the input of the reproducer 10 at the reference numeral 71 and extends to the remote position of the receiver unit 14. The line 70 is provided with electrical connection to the unit 14, as will hereinafter be described, and then extends to the unit 15 by a transmission line 72. In similar manner the line is associated with the unit 15 and thence passes to the unit 16 through a line 73 and on to any desired number of additional receiver units as by a line 74 that may be incorporated in the system.

Figs. 3 and 4 illustrate two alternative methods, series and parallel, respectively, whereby the signal output may be connected in cascade to the transmission line for communication to the reproducer 10. The transmission line 70 of Fig. 3 is shown as comprising a conventional coaxial cable having a central conductor 80 which is insulated from an outer conductor 81. The secondary winding 67 of the transformer 66 of the receiver unit 14 is connected in series relation with the central conductor 80 and a central conductor 83 of the transmission line 72. Similarly the secondary winding of the receiver unit 15, which winding may be designated as **67*a*, is connected in series relation with the central conductor 83 of the line 72 and a central conductor 84 of the line 73. Similar connections are made for successive receiver units that may be added to the system. The outer conductors of each of the transmission lines that are designated by the numerals 81, 85 and 86 are appropriately bridged together by connecting straps 88 and 89** to provide a continuous series circuit.

Fig. 4 illustrates a parallel system for cascade connection of the signal output means to the transmission lines. In this Fig. 4, parts identical to corresponding parts in Fig. 3 have been given the same numeral. The line 70 as in Fig. 3 is provided with a central conductor 80 and an outer conductor 81, and the outer conductors 81, 85 and 86 are connected in series with the straps 88 and 89 as before, but the central conductor 80 in Fig. 4 is connected in series with the central conductors 83 and 84. The secondary windings 67 and **67*a* are connected to the central and outer conductors through isolating condensers 91 and 92**.

Thus, there are provided, as shown in Figs. 3 and 4, two alternative methods whereby the signals of any of the signal output means of any of the receiver units 14, 15, 16, etc., may be connected to the transmission line 70 in cascade for connection to the reproducer 10.

Figs. 1, 2 and 4 represent the basic principle of the present invention whereby a predetermined radio-frequency signal may be selected at a remote location and conveyed to a utilization circuit at a master location. In operation, for example with a conventional television reproducer, the master switch 27 is closed simultaneously with the on-off switch 12 of the reproducer whereby a low A. C. voltage is supplied to the movable arm 31 and the branch conductor 32. Through the conductor 32, all of the heating elements of the tubes within the receiver units are energized, the heaters of any individual unit being identified in Fig. 2 as the heaters 40 and 43. By manipulation of the channel frequency selector 13 the user selects the particular channel to be received and simultaneously the movable arm 31 is connected to the particular receiver unit which is tuned to the same frequency. If the frequency selected corresponds to branch conductor 35, the power transformer 47 (see Fig. 2) is energized providing a direct-current potential for the tube 41 of the receiver unit 14, and all other receiver units, for example units 15 and 16, are inoperative in this respect.

The signal received by the antenna 17, and which is filtered through the network represented by the transformer 56 and condenser 58, is amplified by the tube 41, appears across the primary winding 65, and thence appears across the secondary winding 67 of the transformer 66. Referring to Fig. 3 or 4, the signals to be received appear only across the winding 67 and not across the secondary winding **67*a* or any other secondary winding of other receivers due to all of the other receiver units being inoperative. Therefore, a filtered and amplified signal is produced across the conductors 80 and 81 of the transmission line 70 for communication to the reproducer 10**.

It is of particular import to note that the selected signal has been filtered and amplified at its received source and conveyed in such form by the transmission line 70. Accordingly, any extraneous signals or noise that may be picked up by the line 70 will be relatively small compared to the signal transmitted and therefore imperceptible in image resolution or sound reproduction. The reproducer 10 is therefore provided at the reference numeral 71 with a predetermined signal frequency, having a high signal-to-noise ratio, which is most desirable, and in many instances mandatory in television reception.

Figure 5:
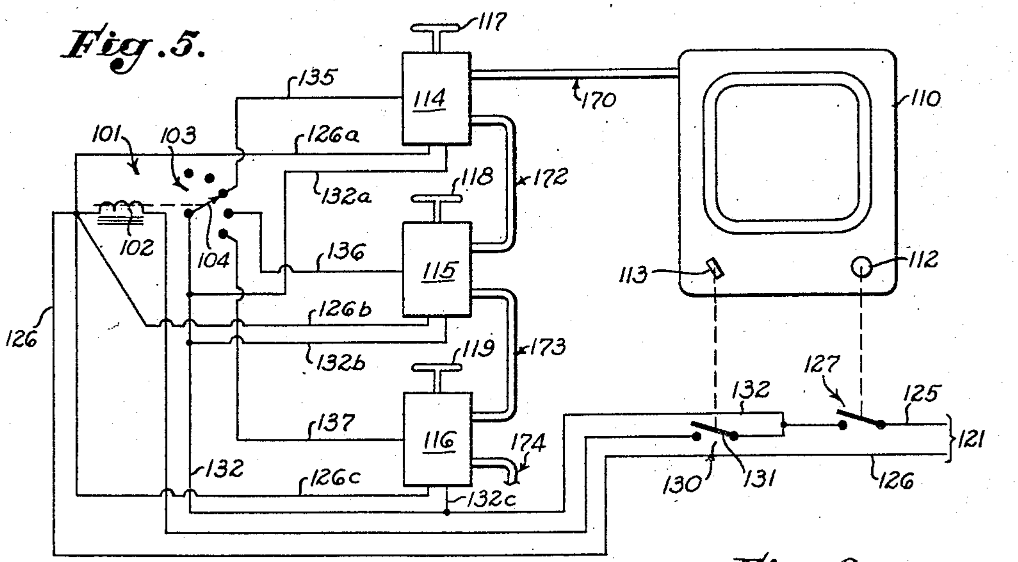
Fig. 5 is a schematic diagram of an alternative form of the multiple antenna arrangement of Fig. 1 showing the selector means in remote control disposition.

Fig. 5 is illustrative of a modification of the system illustrated in Fig. 1 whereby the power input means to the receiver units is reduced to a minimum of three conductors for any plurality of receiver units that may be employed. A reproducer unit 110 is provided with an on-off switch 112, a channel frequency selector 113 and a transmission line 170 similar to that of Fig. 1. A source of power 121 is provided to conductors 125 and 126 and is applied through a master switch 127 to a selecting switch 130. In this instance, however, the selector switch of Fig. 1 is replaced by a single-pole instantaneous switch 130 having a movable arm 131 which is ganged to the selector 113. Manipulation of the switch 113 through each channel seelcted causes the arm 131 of the switch 130 to make a signal contact only for single-step actuation of a step relay which will be described hereinafter. A conductor 132 is in continuous electrical connection with the switch arm 131 and provides a part of the power input means for receiver units 114, 115, 116, etc., at the remote location.

The receiver units 114, 115 and 116 are provided with antennae 117, 118 and 119, respectively. Also, the receiver units are connected to the transmission line 170 and transmission lines 172, 173 and 174, which connections may be as heretofore described with respect to Figs. 3 and 4.

The remote control selector system as illustrated in Fig. 5 includes a relay 101 which comprises a coil 102, a switch 103 and integral movable arm 104. The switch is provided with taps for individual connection to a plurality of branch power conductors 135, 136 and 137 which conductors are connected to the receiver units 114, 115 and 116, respectively. The relay coil 102 is provided with connections intermediate the switch 130 at the master location and the return conductor 126. The movable arm 104 of the switch 103 serves as a power distribution means to the receiver units and is connected on one side to the conductor 132 and on the other side to any of the branch power conductors 135, 136 and 137. Leading from the conductor 132 are conductors **132*a*, 132*b* and 132*c* which are communicated to the receiver units 114, 115 and 116, respectively, and provide a source of energization for the heaters of the electron tubes contained therein. Further, each receiver unit is provided with a return line identified by the numerals 126*a*, 126*b* and 126*c* connecting to the main return conductor 126**.

The receiver units 114, 115 and 116 are similar in structure and operation and may be the same as heretofore described with respect to Fig. 2 in relation to the power input means thereto and the signal output means therefrom.

In operation, the system of Fig. 5 is similar to that of Fig. 1 with the exception of the remote control means for selectively energizing the individual receiver units. In this instance, the user, by manipulation of the channel selector switch 113 and progressively passing from channel to channel causes the switch arm 131 to momentarily close or to open and close intermittently for each channel frequency traversed. For each cycle of movement of the switch 130 the relay 101 is de-energized and energized, causing the movable arm 104 of the switch 103 to advance one step, for example from branch power conductor 135 to branch power conductor 136. In such manner, the receiver unit 115 will be energized, all other units being deenergized, and the signal received and transmitted to the reproducer 110 will correspond to the channel frequency selected in accordance with the position of the selector switch 113.

Figure 6:
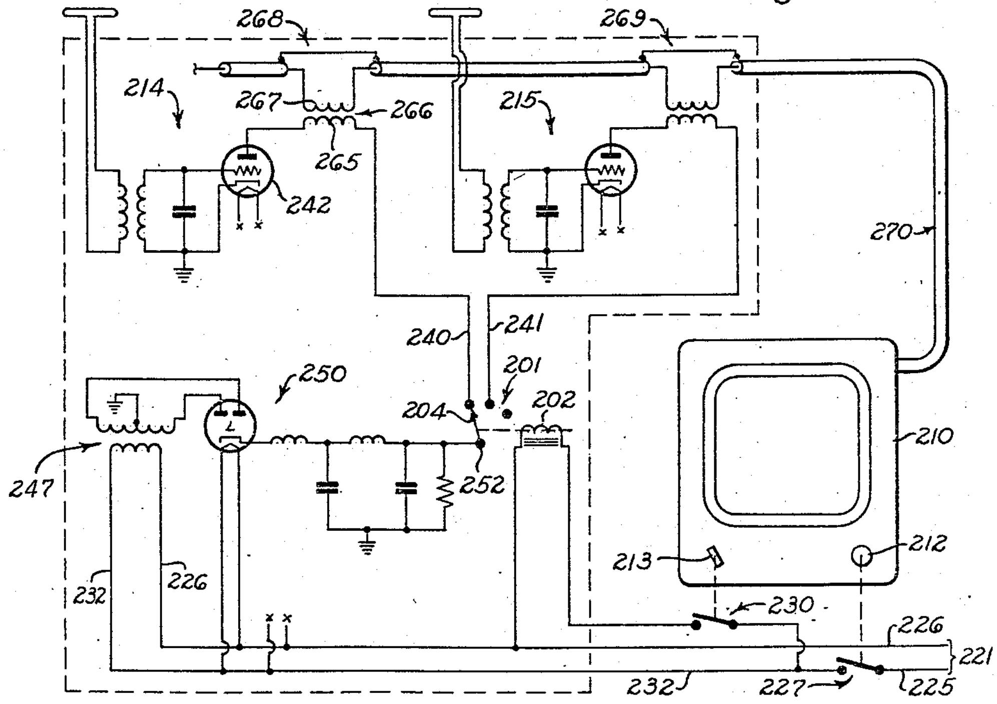
Fig. 6 is a schematic diagram of another form of the multiple antenna arrangement showing the selector means in remote control disposition in association with a power supply common to all the receivers.

Fig. 6 illustrates another alternative multiple antenna arrangement whereby the power supply for the receiver units may be derived from a single unit and the antenna selection may be remotely controlled from the main location.

In particular, a reproducer 210 is provided with an on-off switch 212, a channel selector switch 213 and a transmission line 270. A source of power 221 is provided to conductors 225 and 226 and is applied through a master switch 227 to a selector switch 230. Also connected to the switch 227 is a conductor 232 that provides, along with the conductor 226, a source of power to a power transformer 247 of a power supply 250.

The power supply 250 in this instance is part of and common to receiver uits 214, 215, etc., and provides a source of direct-current potential thereto as selectively determined by a selector switch 201. The power supply 250 is similar to the rectification circuit 50 of Fig. 2 and provides, in Fig. 6, a direct-current potential, for example at the point indicated by the numeral 252, which potential is sufficient to supply the demand of the unit 214 or 215.

The selector switch 201 comprises a coil 202 and a movable switch arm 204, which arm is adapted to cooperate with a plurality of taps, which taps are individually connected to branch power conductors 240 and 241. Each of the branch power conductors is connected to its respective unit; for example, conductor 240 is connected to unit 214 and to the plate of an electron tube 242, and through a primary winding 265 of a coupling transformer 266.

Each of the units 214 and 215 is provided with signal output means, which means are generally indicated by the numerals 268 and 269, respectively. The signal output means as illustrated in Fig. 6 are connected in cascade to the transmission line 270 and operate as heretofore described with respect to Fig. 3. It is contemplated, however, that the signal output means of Fig. 4 may be substituted into Fig. 6 and be connected and operate as heretofore described.

The arrangement of Fig. 6 provides a common power source for the receiver units, all being located at the remote location. The heaters of all the electron tubes are continually energized so as to preclude any delay in response of any receiver unit when the frequency is changed, for example, from channel to channel. As illustrated, the selector switch is communicated with branch power conductor 240, thereby providing power to the unit 214. If the operator desires to tune to the next adjacent channel, the selector switch is changed with a resulting impulse contact of the switch 230 comparable to that heretofore described with respect to switch 130 of Fig. 5, which impulse will energize the coil 202 to cause the arm 204 of the switch to advance one tap to then communicate with the branch power conductor 241 of the unit 215.

While the invention that has been illustrated and described is now regarded as the preferred embodiment, the construction and arrangement are, of course, subject to modification without departing from the spirit and scope of the invention. It is therefore not desired to restrict the invention to the particular forms of construction and arrangement illustrated and described, but to cover all modifications that may fall within the scope of the appended claims.

I claim as my invention:

1. In a multiple antenna arrangement for a radio-frequency utilization circuit having a frequency selector means, the combination of: a plurality of receiving antennae; a plurality of tuned radio-frequency receivers connected each to one of said antennae, each of said receivers having a power input means and a signal output means; a common transmission line in cascade connection with each of said signal output means and connected to said utilization circuit; a source of electrical power; and switch means for selectively connecting said source of power to each of said power input means in unison with variation of said utilization circuit frequency selector means.

2. In a multiple antenna arrangement for a radio-frequency utilization circuit having a frequency selector means, the combination of: a plurality of receiving antennae adjusted to different frequencies; a plurality of tuned radio-frequency receivers connected each to one of said antennae, each of said receivers having a power input means and a signal output means; a common transmission line connected to said utilization circuit; means electrically connecting said line with each of said signal output means; a source of electrical power; and switch means for selectively connecting said source of power to each of said power input means in unison with variation of said utilization circuit frequency selector means.

3. In a multiple antenna arrangement for a radio-frequency utilization circuit having a frequency selector means, the combination of: a plurality of antennae adapted to be operated at different frequencies; a plurality of radio-frequency receivers connected each to one of said antennae, each receiver including a power input means and an electron discharge device having an anode, a cathode and a control electrode; circuit means for each of said receivers operating to couple its antenna to the input of said electron discharge device, each circuit means being tuned to the frequency of its coupled antenna; a signal output circuit for each of said receivers and connected in the output of each of said electron discharge devices; a transmission line electrically connected to the signal output circuit of each of said receivers and connected to said utilization circuit; a source of electrical power; and selector means for selectively connecting said source of power to each of said power input means in unison with variation of said utilization circuit frequency selector means.

4. In a multiple antenna arrangement for a radio-frequency utilization circuit having a frequency selector means, the combination of: a plurality of antennae adapted to be operated at different frequencies; a plurality of radio-frequency receivers connected each to one of said antennae, each receiver including a power input means and an electron discharge device having an anode, a cathode and a control electrode; a circuit for each of said receivers comprising inductance and capacitance coupled to two electrodes of said electron discharge device, each circuit being tuned to the frequency of its connected antenna; a signal output circuit for each of said receivers and connected in the output of each of said electron discharge devices; a common transmission line in cascade connection with each of said signal output circuits and connected to said utilization circuit; a source of electrical power; and switch means for selectively connecting said source of power to each of said power input means simultaneously with variation of said utilization circuit frequency selector means.

5. In a multiple antenna arrangement for a radio-frequency utilization circuit having a frequency selector means, the combination of: a plurality of receiving antennae; a plurality of radio-frequency receivers connected each to one of said antennae, each of said receivers having a signal output means; a common transmission line connected to said utilization circuit, said line having a first and a second conductor; a plurality of circuit means for electrically connecting said transmission line to the signal output means of each of said receivers; power supply means electrically connected to said receivers for supplying power to said receivers; a source of electrical power for said power supply means; and switch means for selectively energizing said receivers with variation of said utilization circuit frequency selector means.

6. In a multiple antenna arrangement for a radio-frequency utilization circuit having a frequency selector means, the combination of: a plurality of receiving antennae adapted to be operated at different frequencies; a plurality of radio-frequency receivers connected each to one of said antennae, each receiver including an electron tube and having a signal output means; a circuit for each of said receivers for coupling its antenna thereto, each said circuit being tuned to the frequency of its antenna; a common transmission line in cascade connection with each of said signal output means and connected to said utilization circuit; a rectifier for each of said receivers for supplying power to the electron tube of its receiver; a source of alternating potential; and switch means provided with a movable element for selectively connecting said source of alternating potential to said rectifiers simultaneously with variation of said utilization circuit frequency selector means, whereby a receiver of a desired operating frequency may be energized to correspond to the operating frequency of said utilization circuit.

7. An apparatus according to claim 5 in which each of said plurality of circuit means includes a transformer having a primary winding and a secondary winding, said primary winding being connected to its associated signal output means, and said secondary winding being connected in series with one of said transmission line conductors.

8. An apparatus according to claim 5 in which each of said plurality of circuit means includes a transformer having a primary winding and a secondary winding and including a reactance, said primary winding being connected to its associated signal output means, and said secondary winding being connected through said reactance and in parallel with said first and second conductors of said transmission line.

9. In a multiple antenna arrangement for a radio-frequency utilization circuit having a signal input means, the combination of: a frequency selector for said utilization circuit for tuning said circuit to predetermined frequencies; a plurality of remotely located radio-frequency receivers, each receiver including an electron tube having an anode, a cathode and a control electrode and including a tuned circuit coupled to the input electrodes of said tube; a plurality of antennae connected each to one of said receivers and each adjusted to the frequency of its receiver-tuned circuit; a common transmission line connected to said utilization circuit; circuit means electrically connecting the output of said electron tubes in cascade with said transmission line; a rectifier for each of said receivers for providing said electron tubes with a direct-current potential; a source of relatively low alternating-current potential; and switch means provided with a movable element for selectively operatively connecting said source of alternating-current potential to said rectifiers simultaneously with variation of said frequency selector, whereby any one of said radio-frequency receivers may be selectively energized to correspond with the desired operating frequency of said utilization circuit.

10. A multiple antenna system, including: a tunable radio-frequency utilization circuit at a master location having a signal input means and having a frequency selector means for tuning said circuit to receive predetermined frequencies; a plurality of tuned radio-frequency receivers disposed at a spaced location each having a signal output means and each tuned to one of said predetermined frequencies; a plurality of tuned antennae connected each to one of said receivers and tuned to the frequency of its receiver; a transmission line connected to said utilization circuit signal input means; means for connecting all of said receiver signal output means in cascade to said transmission line; a rectifier for each of said receivers to supply said receivers with power, each said rectifier having a relatively low-voltage input means; a source of low-voltage alternating current at said master location; switch means at said spaced location provided with a movable contact for selective connection with said rectifier input means; circuit means connecting said source of low voltage to said movable contact; and means for moving said movable contact including switch means at said master location, said last-mentioned means being actuable in unison with said utilization circuit frequency selector means, whereby any one of said tuned receivers is energized and electrically operably connected to said utilization circuit to correspond with the desired operating frequency of said utilization circuit.

11. A multiple antenna system, including: a tunable radio-frequency utilization circuit at a master location having a signal input means and having a frequency selector means for tuning said circuit to receive predetermined frequencies; a plurality of tuned radio-frequency receivers disposed at a spaced location each having a signal output means and each tuned to one of said predetermined frequencies; a plurality of tuned antennae connected each to one of said receivers and tuned to the frequency of its receiver; a transmission line connected to said utilization circuit signal input means; means for connecting all of said receiver signal output means in cascade to said transmission line; rectifier means to supply said receivers with power, said rectifier means having a relatively low-voltage input means; a source of low-voltage alternating current at said master location; switch means at said spaced location connected intermediate said low-voltage alternating current and said radio-frequency receivers, said switch means being provided with a movable contact for selective connection with said radio-frequency receivers; and means for moving said movable contact including switch means at said master location, said last-mentioned means being actuable in unison with said utilization circuit frequency selector means, whereby any one of said tuned receivers is energized and electrically connected to said utilization circuit to correspond with the desired operating frequency of said utilization circuit.

12. A multiple antenna system, including: a tunable radio-frequency utilization circuit at a master location having a signal input means and having a frequency selector means for tuning said circuit to receive predetermined frequencies; a plurality of tuned radio-frequency receivers disposed at a spaced location each having a signal output means and a power input means and each tuned to one of said predetermined frequencies; a plurality of tuned antennae connected each to one of said receivers and tuned to the frequency of its receiver; a transmission line connected to said utilization circuit signal input means; means for connecting all of said receiver signal output means in cascade to said transmission line; rectifier means to supply said receivers with power, said rectifier means having a relatively low-voltage input means; a source of low-voltage alternating current at said master location; switch means at said spaced location provided with a movable contact for selective connection with said power input means; circuit means connecting said source of low-voltage alternating current to said rectifier input means; circuit means connecting said rectifier means to said movable contact; and means for moving said movable contact including switch means at said master location, said last-mentioned means being actuable in unison with said utilization circuit frequency selector means, whereby any one of said tuned receivers is energized and electrically operably connected to said utilization circuit to correspond with the desired operating frequency of said utilization circuit.

References Cited in the file of this patent

UNITED STATES PATENTS

| | | |
|---|---|---|
| 1,658,825 | Wolf | Feb. 14, 1928 |
| 1,840,013 | Benson | Jan. 5, 1932 |
| 2,428,300 | Scott | Sept. 30, 1947 |
| 2,523,173 | Winters | Sept. 19, 1950 |
| 2,531,438 | Jones | Nov. 28, 1950 |
| 2,679,001 | Tomcik | May 18, 1954 |